ered by the following specific examples which are given for the purpose

United States Patent Office 3,148,216
Patented Sept. 8, 1964

3,148,216
N,N'-TETRAMETHYLENE-BIS(2,6-DI-METHYLANILINE)
Seymour L. Shapiro, Hastings on Hudson, and Louis Freedman, Bronxville, N.Y., assignors to U.S. Vitamin and Pharmaceutical Corporation, New York, N.Y., a corporation of Delaware
No Drawing. Filed Jan. 5, 1960, Ser. No. 508
1 Claim. (Cl. 260—570.5)

This invention is concerned with the preparation of N,N'-tetramethylene-bis(2,6-dimethylaniline), I which has the following structure:

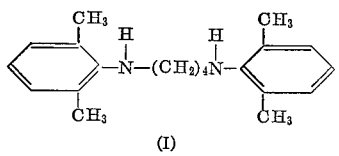

(I)

In our co-pending patent application, Ser. No. 742,752, filed June 18, 1958, now U.S. Patent No. 2,993,831, issued July 25, 1961, it was disclosed that compounds of the formula:

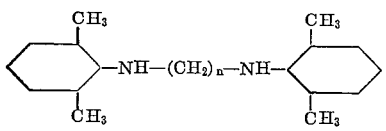

are potent anesthetic agents with desirable lack of toxicity. In the formula, $n=3$–$5$, thus including the N,N'-tetramethylenebis(2,6-dimethylaniline) which is the subject of this invention. However, it was found that the subject compound of this application could not be prepared by conventional techniques, and accordingly, a new process for the preparation of this novel compound has been made the object of this invention.

In the attempted preparation of the subject compound by reaction of 2,6-dimethylaniline with 1,4-dibromobutane, the desired compound could not be realized by this reaction since even in the presence of an excess of the 2,6-dimethylaniline, the favored reaction was apparently that where the compound cyclized as shown in the equation below.

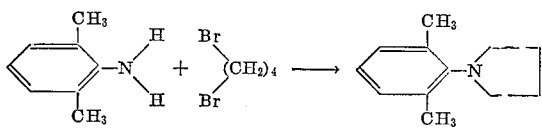

For preparation of the required compound it was necessary first to prepare the N,N'-bis-succin-(2,6-dimethylanilide), II and reduce this under forcing conditions with lithium aluminum hydride. Under such conditions only partial reduction occurred, the compound isolated being the (α-[2,6-dimethylanilino]-butyr) - 2,6-dimethylanilide, III. This in turn was isolated and upon treatment with lithium aluminum hydride yielded the subject compound, I. These transformations are shown in the Scheme I below.

SCHEME I
R-2,6-dimethylphenyl

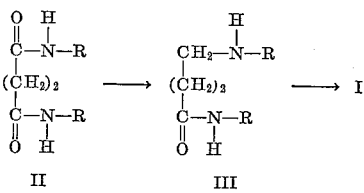

The process and compounds of this invention will be more clearly understood from a consideration of the following specific examples which are given for the purpose of illustration only and are not to be construed as limiting the scope of the invention in any way.

Example 1

A solution of 9.3 g. (0.06 mole) of succinyl chloride in 60 ml. of ether was added gradually with stiring to a solution of 29.0 g. (0.24 mole) of 2,6-dimethylaniline in 200 ml. of ether. After the addition, stirring was continued for 40 minutes and the mixture of product and 2,6-dimethylaniline hydrochloride separated, washed with ether and then with water. The water-insoluble product N,N'-bis(2,6 - dimethylphenyl)succinamide, 24.9 g. (90%), melted at 322–323° C. after recrystallization from methyl Cellosolve.

*Analysis.*—Calcd. for $C_{20}H_{24}N_2O_2$: C, 74.0; H, 7.5; N, 8.6. Found: C, 73.8; H, 6.9; N, 8.7.

Example 2

(γ-[2,6 - dimethylanilino]-butyr) - 2,6 - dimethylanilide was obtained as follows: A mixture of 4.56 g. (0.12 mole) of lithium aluminum hydride in 300 ml. of ether was stirred under reflux and 13.0 g. (0.04 mole) of N,N'-bis-(2,6-dimethylphenyl) succinamide in 200 ml. of dioxane added. The reaction was maintained under reflux for 60 hours. After cautious addition of 2 ml. of water, 4.5 ml. of 40% sodium hydroxide was added and the reaction mixture stirred for 3 hours. Ether (400 ml.) was added and the residue separated and rinsed with two 300-ml. portions of ether. The combined filtrates were concentrated to about 25 ml. and on standing at 10° C., 5.9 g. (47.5%) of the product separated, M.P. 145–148° C., recrystallized (heptane) M.P. 149–150° C.

*Analysis.*—Calcd. for $C_{20}H_{26}N_2O$: C, 77.4; H, 8.4. Found: C, 77.5; H, 8.0.

Example 3

N,N'-tetramethylene-bis(2,6-dimethylaniline) was obtained as follows: A mixture of 1.52 g. (0.04 mole) of lithium aluminum hydride in 300 ml. of ether was treated with a slurry of 4.65 g. (0.015 mole) of (γ-[2,6-dimethylanilino]-butyr)-2,6-dimethylanilide in 300 ml. of ether. After stirring under reflux for 30 hours and standing for an additional 90 hours, 1.0 ml. of water followed by 1.0 ml. of saturated sodium chloride and 2.25 ml. of 40% sodium hydroxide solution was added. The formed granular precipitate was separated, rinsed with ether and the combined ether filtrates concentrated. Unreacted anilide (2.4 g.) precipitated and was separated. The filtrate was evaporated to yield a residue which was distilled. There was obtained 1.11 g. (25%) of product boiling at 172–

182° C. (0.11 mm.). On standing at room temperature the product crystallized, M.P. 61–63° C., recrystallized (pentane) M.P. 72–73° C.

*Analysis.*—Calcd. for $C_{28}H_{28}N_2$: C, 81.0; H, 9.5; N, 9.5. Found: C, 81.1; H, 9.4; N, 9.7.

It is to be understood that it is intended to cover all changes and modifications of the examples of the invention herein chosen for the purpose of illustration which do not constitute departure from the spirit and scope of the invention.

This application is a continuation in part of our co-pending application, Serial No. 742,752, filed June 18, 1958.

We claim:

A process for the preparation of N,N'-tetramethylene-bis(2,6-dimethylanilines) which comprises reacting a stoichiometric excess of a 2,6-dimethylaniline with succinyl chloride in an inert organic solvent until formation of N,N'-bis-succin-(2,6-dimethylanilide), reacting the bis-anilide with a stoichiometric excess of lithium aluminum hydride in ether-dioxane until formation of the corresponding monoanilide, and reacting the monoanilide with a stoichiometric excess of lithium aluminum hydride in ether to form the bis-(2,6-dimethylaniline).

References Cited in the file of this patent
UNITED STATES PATENTS

| | | |
|---|---|---|
| 2,653,977 | Craig et al. | Sept. 29, 1953 |
| 2,739,981 | Szabo et al. | Mar. 27, 1956 |
| 2,752,393 | Martin | June 26, 1956 |
| 2,762,845 | Stroh et al. | Sept. 11, 1956 |
| 2,895,991 | Randall et al. | July 21, 1959 |
| 2,921,093 | Shapiro et al. | Jan. 12, 1960 |

OTHER REFERENCES

Scholtze et al.: Berichte, vol. 40, pages 852 to 858 (1907).

Sommers et al.: Jour. Am. Chem. Soc., vol. 75, pages 5280 to 5283 (1953).

Larizza et al.: "Gazzetta Chim. Ital.," vol. 89, pages 2018 to 2023 (1959).

UNITED STATES PATENT OFFICE
CERTIFICATE OF CORRECTION

Patent No. 3,148,216 September 8, 1964

Seymour L. Shapiro et al.

It is hereby certified that error appears in the above numbered patent requiring correction and that the said Letters Patent should read as corrected below.

Column 1, line 60, for "(α-[2,6-" read -- (γ-[2,6- --; column 2, line 2, heading to SCHEME I, for "R-2,6-dimethylphenyl read -- R=2,6-dimethylphenyl --; line 20, for "stiring" read -- stirring --.

Signed and sealed this 12th day of January 1965.

(SEAL)
Attest:

ERNEST W. SWIDER
Attesting Officer

EDWARD J. BRENNER
Commissioner of Patents